(12) United States Patent
Varsell et al.

(10) Patent No.: US 6,627,833 B2
(45) Date of Patent: Sep. 30, 2003

(54) FIXTURE FOR SECURING A WORKPIECE

(75) Inventors: Richard W. Varsell, Bristol, CT (US);
Donald Joseph Voisine, Terryville, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/060,764

(22) Filed: Jan. 30, 2002

(65) Prior Publication Data

US 2003/0141284 A1 Jul. 31, 2003

(51) Int. Cl.⁷ ............................. B23H 1/00; B23H 9/00
(52) U.S. Cl. .................................. 219/69.11; 269/152
(58) Field of Search ............................. 269/228, 236, 269/152, 153; 219/69.11

(56) References Cited

U.S. PATENT DOCUMENTS

| | | | |
|---|---|---|---|
| 3,331,166 A | * | 7/1967 | Brenning |
| 3,827,965 A | * | 8/1974 | Andrews |
| 4,463,241 A | | 7/1984 | Smith |
| 4,638,602 A | * | 1/1987 | Cavalieri |
| 5,847,350 A | | 12/1998 | Dorrel et al. |
| 5,951,884 A | * | 9/1999 | Futamura |
| 6,279,887 B1 | * | 8/2001 | Glasenapp et al. |
| 6,287,182 B1 | * | 9/2001 | Dwyer |
| 6,326,576 B1 | | 12/2001 | Krenz et al. |
| 6,560,890 B1 | * | 5/2003 | Madge et al. |

* cited by examiner

Primary Examiner—Geoffrey S. Evans
(74) Attorney, Agent, or Firm—Brian J. Hamilla

(57) ABSTRACT

A fixture for securing a workpiece, which includes: a base; a plurality of locators on the base for accepting the workpiece; a plurality of arms, each secured to the base at a pivot point; and a lever for actuating the arms against the workpiece. The arms positively position the workpiece against the locators. The fixture is part of an electrical discharge machining (EDM) apparatus, which also includes a tank and a holder for supporting an electrode in said tank. The lever actuates towards a front of the tank.

20 Claims, 5 Drawing Sheets

FIXTURE FOR SECURING A WORKPIECE

TECHNICAL FIELD

This invention relates to a fixture for securing a workpiece. Specifically, the present invention is a fixture for securing a workpiece within an electrical discharge machining (EDM) apparatus.

BACKGROUND OF THE INVENTION

EDM is a common method of machining features into workpieces. Common examples of workpieces that undergo EDM include gas turbine engine components such as blades and vanes.

FIG. 1 displays a schematic of a typical EDM apparatus 10. The apparatus 10 includes an electrode 11, a holder 13 for the electrode, and a fixture 15 for supporting a workpiece W. The electrode 11, holder 13 and fixture 15 reside within a tank 17 filled with dielectric (e.g. deionized water).

An actuator 19 advances the electrode 11 towards the workpiece W to create a suitable gap. Once the electrode 11 and the workpiece W receive suitable electrical cabling (not shown), power is supplied to the cabling. The current through the cabling creates an electrical potential between the electrode 11 and the workpiece W. The electrical potential between the electrode 11 and the workpiece W creates a spark therebetween. The spark vaporizes a portion of the workpiece W.

By controlling movement of the electrode 11 relative to the workpiece W, the EDM apparatus can produce many desired shapes with significant accuracy. These shapes include notches, slots and holes. To ensure accurate placement of these shapes on the workpiece, the fixture 15 must positively position the workpiece W.

FIGS. 2 and 3 display parts of a conventional EDM apparatus 50 relevant to this discussion. A fixture 51 for the workpiece includes two discrete toggle clamp assemblies 53, 55 used to retain the workpiece against a nest assembly 57. The nest assembly 57 conforms to the shape of the workpiece and includes contact points 59 that engage the workpiece. To isolate the workpiece from the fixture 51, the contact points 59 should be electrically non-conductive. Ceramic is a preferred material for the contact points 59.

FIG. 2 shows, in phantom, the preferred workpiece—a turbine blade. Specifically, FIG. 2 displays two cross-sections of the turbine blade. One cross-section is taken at a distal region of an airfoil section of the blade. The other cross-section is taken at a proximal region of the airfoil section of the blade. The nest assembly 57 has six contact points 59, the typical number for orienting an object at a desired position.

Each of the toggle clamps 53, 55 has a spindle arm 61, 63, lever arm 65, 67, link 69, 71, and mounting bracket 73, 75. Using pivot pins, the spindle arm 61, 63 mounts to the bracket 73, 75 and to the lever arm 65, 67. Likewise, the lever arm 65, 67 mounts to the link 69, 71 and to the spindle arm 61, 63. Finally, the link 69, 71 mounts to the bracket 73, 75 and to the lever arm 65, 67. In this arrangement, rotation of the lever arm 65, 67 by an operator O away from the spindle arm 61, 63 can actuate the spindle arm 61, 63 toward the nest assembly 57.

After placing the workpiece into the nest assembly 57, the operator O actuates the toggle clamps 53, 55 in series to secure the workpiece within the fixture 51. Several drawbacks to this arrangement exist.

First, actuation of the toggle clamps 53, 55 can pull the workpiece away from at least some of the contact points 59 in the nest assembly 57. As seen in FIG. 2, the movement of the spindle arm 61, 63 follows actuation path P. The actuation path P is directed away from some of the contact points 59. When the spindle arm 61, 63 engages the workpiece, the actuation path may cause a gap to form between one or more contact points 59. Typically, gaps form at the contact points 59 located on the upper portion of the nest assembly 57. The gaps occurs at these locations since the difference between actuation path P and the contact points 59 is most severe.

Second, sequential actuation of the toggle clamps 53, 55 can pull the workpiece away from at least some of the contact points. Since the workpiece is elongated, actuating a toggle clamp at one end may lift the workpiece from the contact points 59 at the opposite end. Both of these drawbacks can reduce the accuracy of the EDM operation.

While ensuring accurate machining, the EDM apparatus should also have features ergonomically suitable to the operator O. In terms of ergonomics, several drawbacks to the EDM apparatus 50 exist.

First, a confined space exists between a rear of the fixture 51 and a wall 77 of a tank 79 containing the fixture 51. The space is limited due to the size of the EDM tank 79. The operator O must reach over the fixture 51 and into the confined space to reach the toggle clamps.

Second, the confined space limits the size of the toggle clamps 53, 55. A smaller clamp has a smaller lever arm. Thus, an operator must exert a larger force to the toggle clamp to achieve the same torque as a mechanism having a larger lever arm.

Third, the arrangement of the toggle clamps 53, 55 requires the operator O to actuate the toggle clamps 53, 55 along an engaging path E directed towards the rear of the EDM apparatus 50. Residing within the tank 79, the toggle clamps 53, 55 may become wet. The operator's hand could lose grip on the toggle clamps 53, 55. Potentially, the operator's hand could then collide with the tank 79.

Fourth, the toggle clamps 53, 55 may pinch the operator O during release. The operator O disengages the toggle clamps 61, 63 along a release path R directed towards the front of the EDM apparatus 50. Since a tip of the spindle arm 61, 63 is preferably made from rubber, the tip is under compression. As the operator releases the toggle clamps 53, 55, the actuation of the tip rotates the spindle towards the rear of the EDM apparatus 50. In other words, the spindle arm 61, 63 and the lever arm 65, 67 approach each other during release of the toggle clamp 61, 63. Unfortunately, pinching may occur if the hand or finger of the operator O is positioned between the spindle arm 61, 63 and the lever arm 65, 67 during release.

DISCLOSURE OF THE INVENTION

It is an object of the present invention to provide an improved EDM apparatus.

It is a further object of the present invention to provide an improved workpiece fixture.

It is a further object of the present invention to provide a fixture that positively locates the workpiece against each contact point.

It is a further object of the present invention to provide a fixture that simultaneously locates the entire workpiece against the contact points.

It is a further object of the present invention to provide a fixture having improved ergonomics.

It is a further object of the present invention to provide a fixture capable of actuation with only one hand.

It is a further object of the present invention to provide a fixture in which actuation of a clamping occurs in a direction oriented towards the front of the apparatus.

It is a further object of the present invention to provide a fixture in which the clamping assembly parts move in the same direction when engaging and releasing the workpiece.

It is a further object of the present invention to provide a fixture having a larger lever arm.

It is a further object of the present invention to provide a fixture than can retrofit into an existing EDM apparatus.

It is a further object of the present invention to provide a fixture useable on different EDM apparatuses.

These and other objects of the present invention are achieved in one aspect by a fixture for securing a workpiece. The fixture comprises a base; a plurality of locators on the base for accepting the workpiece; a plurality of arms, each secured to the base at a pivot point; and a lever for actuating the arms. The arms positively position the workpiece against the locators.

These and other objects of the present invention are achieved in another aspect by an electrical discharge machining (EDM) apparatus. The apparatus comprises a tank; a holder for supporting an electrode in the tank; and a fixture for supporting the workpiece in the tank. The fixture has a plurality of locators; at least one arm; and a lever for actuating the arm against the workpiece. The lever actuates towards a front of the tank.

These and other objects of the present invention are achieved in another aspect by a method of securing a workpiece. The method comprises the steps of: providing a fixture with a plurality of locators, a plurality of arms and a lever; placing the workpiece on the locators; and actuating the lever to drive the arms against the workpiece.

BRIEF DESCRIPTION OF THE DRAWINGS

Other uses and advantages of the present invention will become apparent to those skilled in the art upon reference to the specification and the drawings, in which.

BEST MODE FOR CARRYING OUT THE INVENTION

Figure 1:
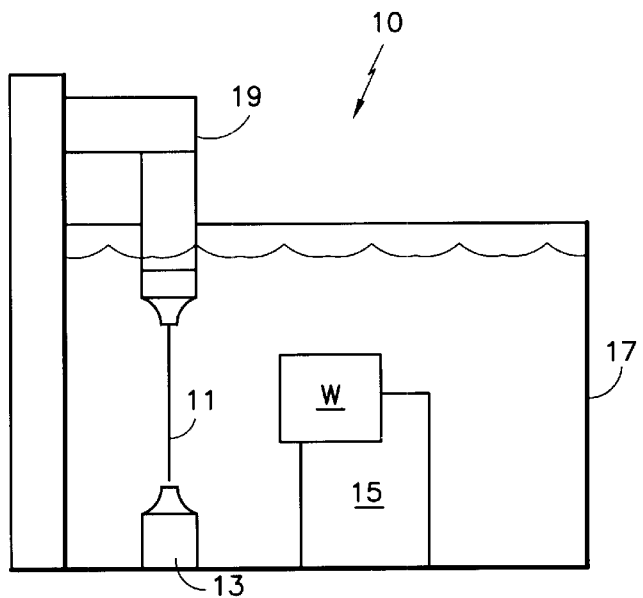
FIG. 1 is a schematic of an EDM apparatus.
Figure 2:
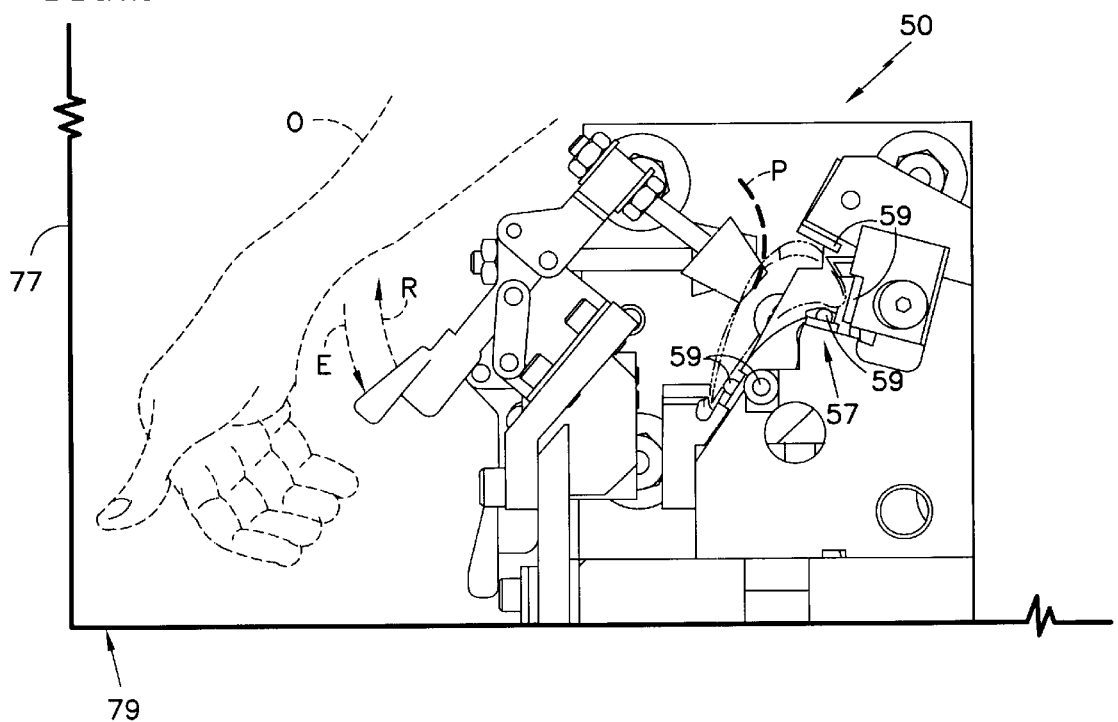
FIG. 2 is a side view of a conventional EDM apparatus.
Figure 3:
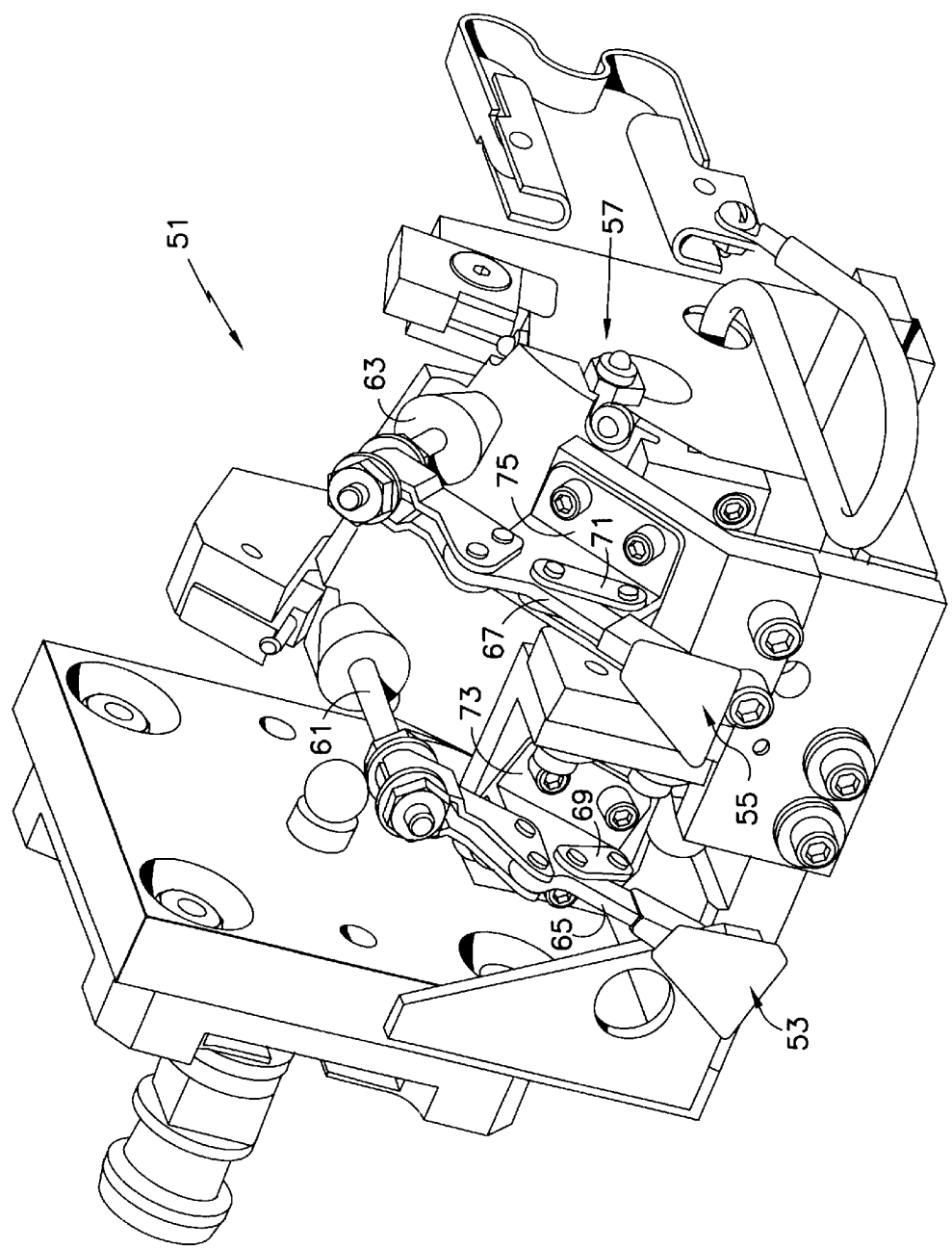
FIG. 3 is a rear perspective view of a workpiece fixture from the conventional EDM apparatus of FIG. 2.
Figure 4:
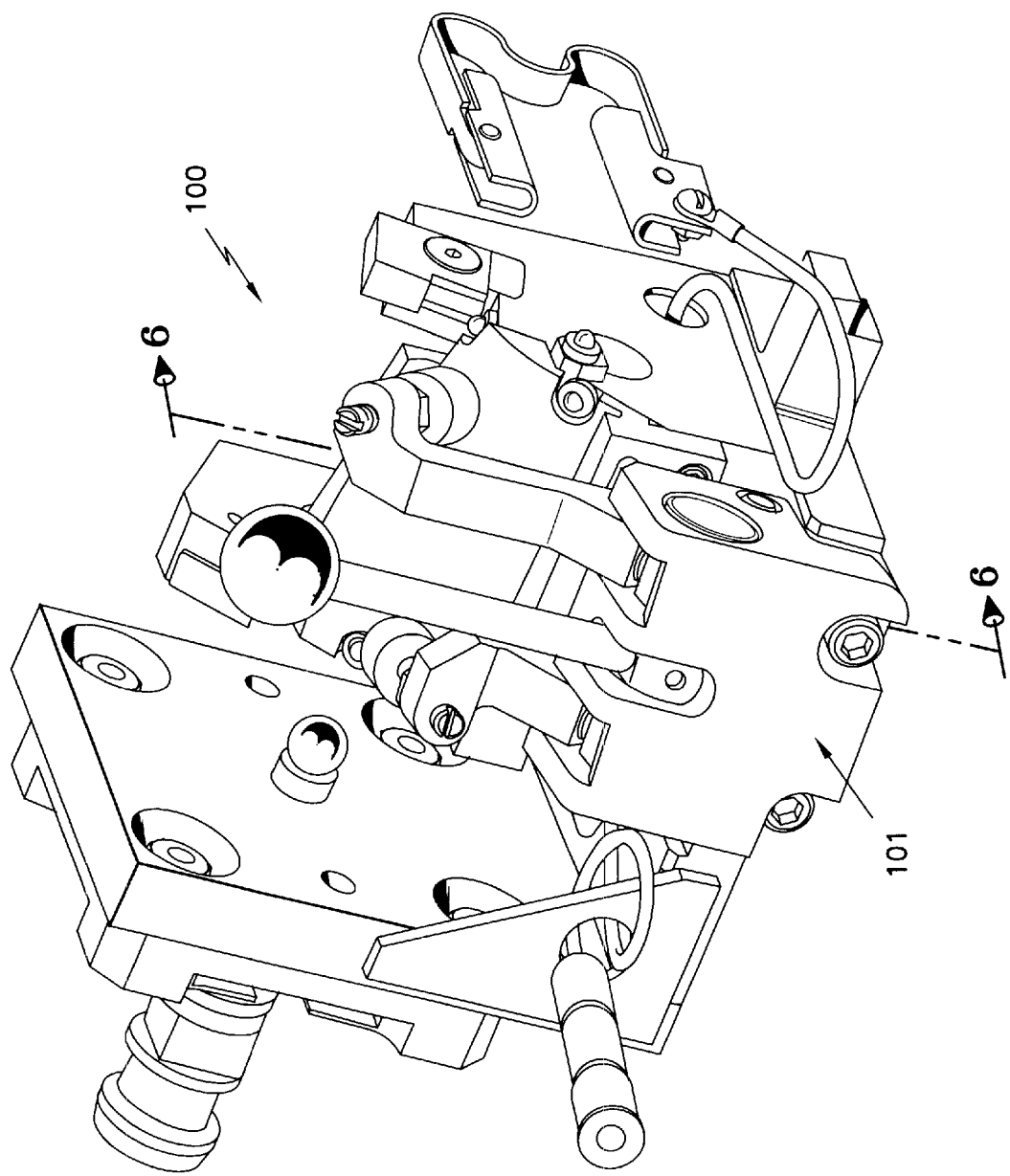
FIG. 4 is a rear perspective view of a workpiece fixture from the present invention.

FIG. 4 is a rear perspective view of one embodiment of a fixture 100 of the present invention. The fixture 100 can use some of the components from the aforementioned fixture 50. Such components, however, are not relevant to the present invention and are not discussed.

Figure 5:
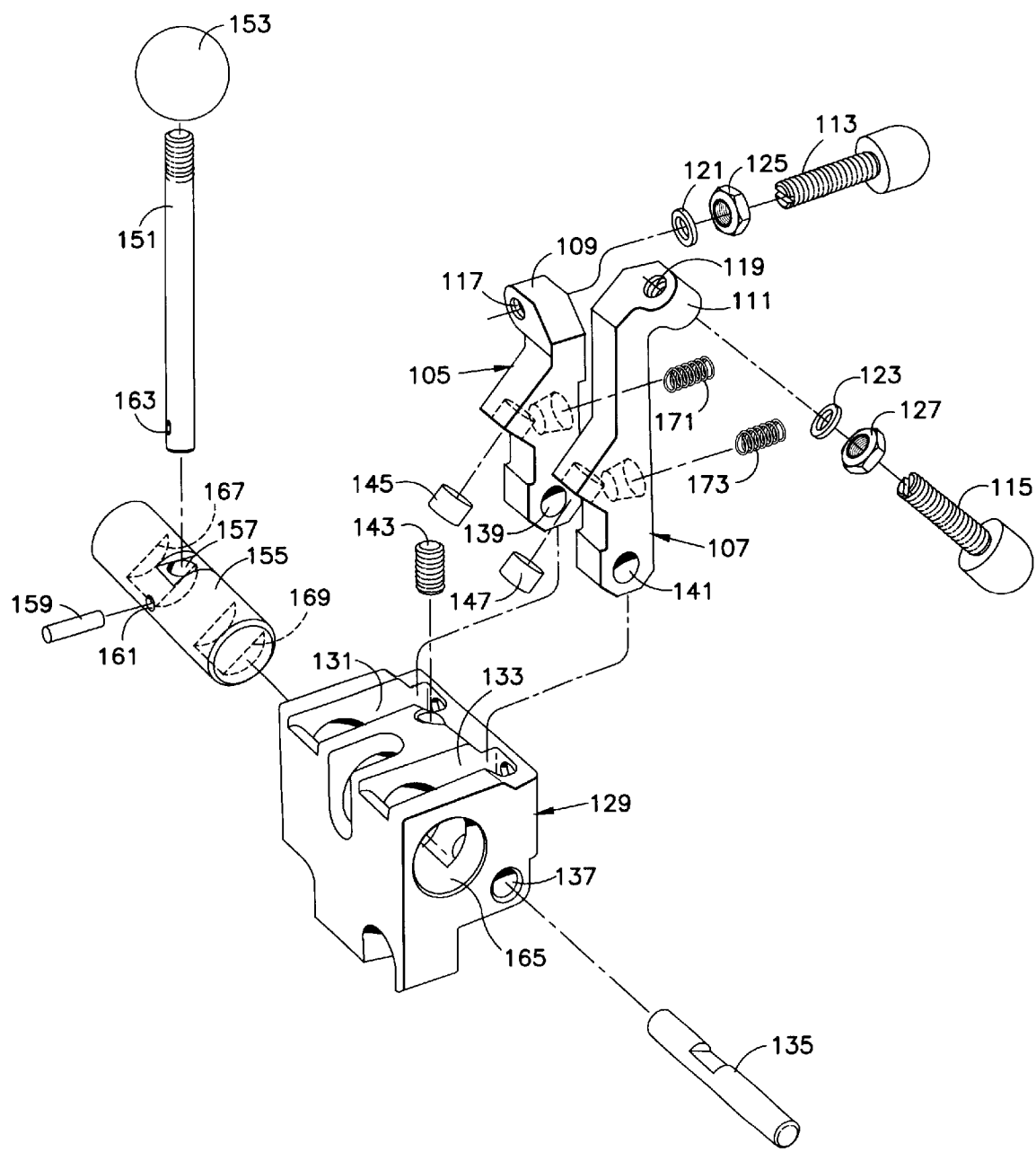
FIG. 5 is an exploded, perspective view of the clamping assembly from the workpiece fixture shown in FIG. 4.

The fixture 100 includes a clamp assembly 101. FIG. 5 is an exploded view of the clamp assembly 101.

The clamp assembly 101 has two spindle arms assemblies 105, 107. Each spindle arm assembly has an arm 109, 111 and a rubber-tipped spindle 113, 115. The spindle 113, 115 preferably mounts to the arm 109, 111 in an adjustable fashion. As seen in the figures, the spindle 113, 115 has threads that engage corresponding threads in an opening 117, 119 in the arm 109, 111. The spindle 113, 115 can also include a lock washer 121, 123 and a jam nut 125, 127 to set the adjustability of the spindle 113, 115.

The arms 109, 111 and spindles 113, 115 could be made from any suitable material, such as plastic (e.g. poly urea urethane RP6444) or stainless steel.

The spindle arm assemblies 105, 107 mount to a body 129 through corresponding channels 131, 133. The body 129 can be made from any suitable material, such as glass-filled nylon or stainless steel. To prevent galling, the body 129 is preferably a glass-filed nylon (e.g. DURAFORM GF available from 3D Systems of Valencia, Calif.) formed by selective laser sintering (SLS). The nylon body 129 can be produced more quickly than a metallic body.

Preferably, a pivot pin 135 extends through a passageway 137 in the main body 129 and through openings 139, 141 in the arms 109, 111. This allows the spindle arm assemblies 105, 107 to rotate relative to the main body 129. A set screw 143 retains the pivot pin 135 within the main body 129.

The arms 109, 111 could have recesses at a medial location to receive wear pads 145, 147. The wear pads can be made from any suitable material, such as an acetal resin like DELRIN available from DuPont of Wilmington, Del. The wear pads 145, 147 prevent galling at the contact point between the two metallic components. If plastic components were used, the present invention could eliminate the wear pads 145.

The clamp assembly 101 uses a single lever arm 151 to actuate both spindle arm assemblies 105, 107. Preferably, the ratio between the force produced in the spindle arm assemblies 105, 107 by the operator-applied force to the lever arm 151 is approximately 9:1. Other ratios, however, are possible.

The lever arm 151 can include a knob 153 threaded to a distal end. A proximal end of the lever arm 151 mounts to a cam 155. Preferably, the lever arm 151 extends into an opening 157 in the cam 155. A cross pin 159 extending into an opening 161 in the cam 155 and an opening 163 in the lever arm 151 secures the lever arm 151 to the cam 155.

The cam 155 resides within an opening 165 in the main body 129. The opening 165 is sized so that the cam 155 can rotate therein. Rotation occurs when the operator O rotates the lever arm 151.

The cam 155 includes shaped surfaces 167, 169 (shown in phantom) against which the wear pads 145, 147 of the spindle arm assemblies 105, 107 seat. Springs 171, 173 partially residing within openings in the arms 109, 111 and in the main body 131 urges the spindle arm assemblies 105, 107 against the cam 155.

The present invention locates the spindle arm assemblies 105, 107 relative to the contact points 59 of the nest assembly so that the spindle arm assemblies 105, 107 urge the workpiece W towards each contact point 59. The specific location of the spindle arm assemblies 105, 107 relative to the contact points 59 necessary to achieve this positive placement feature could be determined using suitable vector analysis software or by other suitable methods.

The clamp assembly 101 could be used on a variety of different EDM machines (not shown). Most of the clamp assembly 101 (i.e. the main body 129) could remain the same. The only non-universal components would be the spindle arm assemblies 105, 107. These assemblies 105, 107 would need to be specifically designed based upon the location of the contact points 59 on the EDM machine and the shape of the workpiece W placed in the machine. The designer would, however, shape each spindle arm assembly 105, 107 to fit into the universal main body 129.

Figure 6A:
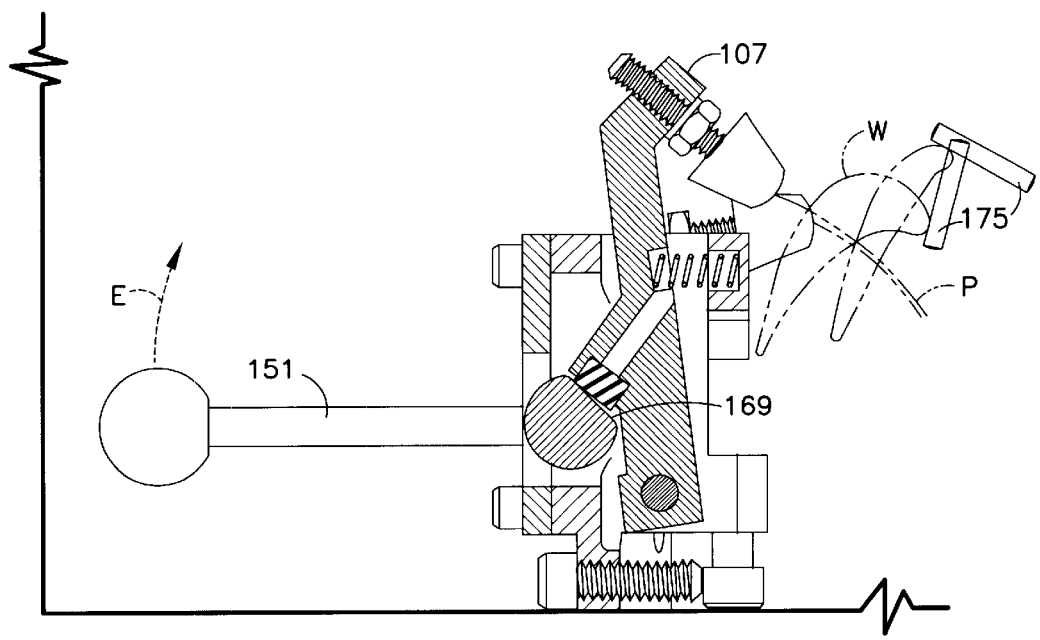
FIG. 6a is a cross-sectional view taken along line VI—VI in FIG. 4 showing the clamping assembly in a disengaged configuration.
Figure 6B:
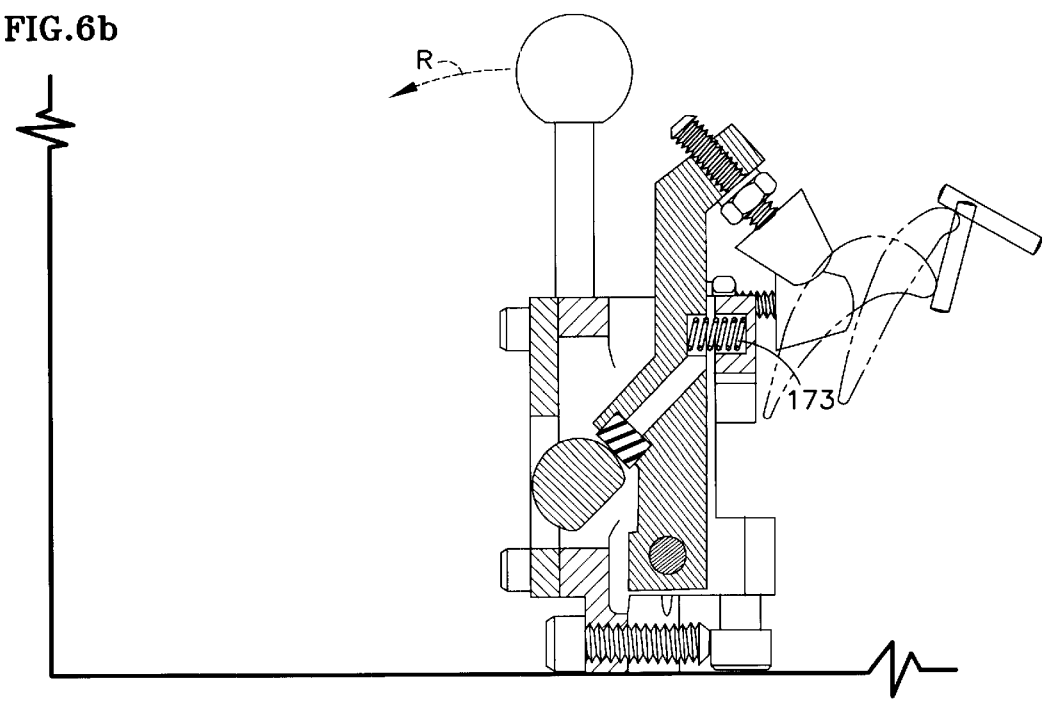
FIG. 6b is a cross-sectional view taken along line VI—VI in FIG. 4 showing the clamping assembly in an engaged configuration.

FIG. 6a displays the fixture 100 in a disengaged configuration. In this arrangement, the operator O can install the workpiece W into the nest assembly (only two contact points 175 of the nest assembly are shown). To clamp the workpiece to the fixture 100, the operator O rotates the lever arm 151 along the engaging path E. Upon rotation, the shaped surfaces 167, 169 of the cam 155 drive the spindle arm assemblies 105, 107 along the actuation path P towards the workpiece W.

FIG. 6a displays the fixture 100 in an engaged configuration. In this arrangement, the workpiece is positively positioned against the contact points 175 of the nest assembly. At this point, the workpiece can undergo the EDM process.

To release the workpiece, the operator O rotates the lever arm 151 along the release path R. Upon rotation, the springs 171, 173 keep the spindle arm assemblies 105, 107 in contact with the cam 155.

Clearly, the present invention provides numerous benefits. First, the single lever arm 151 allows operator actuation with only one hand. The conventional apparatus 10 requires two hands (one per toggle clamp).

Second, the lever arm 51 is larger than the aforementioned conventional lever arm 65, 67. The increased size serves as a force multiplier to operator input. As discussed above the present invention can exhibit a 9:1 ratio of force input to force output. As a result, the operator can easily actuate the lever arm 151. In addition, the operator no longer has to overcome the force of the toggle clamps 53, 55. Finally, the operator O can readily observe or feel the larger lever arm 151 when reaching behind the fixture 100.

Third, the actuation path P of the spindle arm assemblies 105, 107 directs the workpiece W towards the contact points 175 of the nest assembly. This provides positive placement of the workpiece W in the nest assembly.

Fourth, the engaging path E is directed towards the front of the machine.

Fifth, the motion of the lever arm 151 parallels the spindle arm assemblies 105, 107 during actuation. In other words, the parts do not approach each other. Accordingly, the operator O will not be pinched during release of the clamping assembly 101 as occurred in the conventional apparatus 10.

While the previous description related to the retrofit of existing EDM fixtures, the present invention could be added to the design of a new EDM fixture.

In addition, this description focused on a workpiece fixture for EDM machines. The present invention could be used on any equipment that requires secure placement and location of a workpiece. Examples include milling machines, drills, grinders, saws, presses, gages and assembly fixtures.

Finally, the present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A fixture for securing a workpiece, comprising:
   a base;
   a plurality of locators on said base for accepting the workpiece;
   a plurality of arms, each secured to said base at a pivot point; and
   a single lever for actuating said plurality of arms against the workpiece so that said arms positively position the workpiece against said plurality of locators.

2. The fixture as recited in claim 1, wherein said plurality of locators comprise six locators.

3. The fixture as recited in claim 1, wherein said plurality of arms comprise two arms.

4. The fixture as recited in claim 1, wherein the fixture is part of an electrical discharge machining apparatus.

5. The fixture as recited in claim 1, further comprising a cam, wherein said lever rotates said cam, and said cam actuates said plurality of arms.

6. The fixture as recited in claim 1, wherein said plurality of arms actuates in the same direction as said lever.

7. The fixture as recited in claim 1, wherein said lever actuates towards a front of the fixture.

8. An electrical discharge machining (EDM) apparatus, comprising:
   a tank;
   a holder for supporting an electrode in said tank; and
   a fixture for supporting the workpiece in said tank, said fixture having:
      a plurality of locators;
      at least one arm; and
      a lever for actuating said at least one arm against the workpiece;
   wherein said lever actuates towards a front of said tank.

9. The EDM apparatus as recited in claim 8, wherein said at least one arm comprises a plurality of arms.

10. The EDM apparatus as recited in claim 9, wherein said lever actuates said plurality of arms.

11. The EDM apparatus as recited in claim 10, further comprising a cam, wherein said lever rotates said cam, and said cam actuates said plurality of arms.

12. The EDM apparatus as recited in claim 10, wherein said plurality of arms actuates in the same direction as said lever.

13. The EDM apparatus as recited in claim 8, wherein said plurality of locators comprise six locators.

14. The EDM apparatus as recited in claim 8, wherein said at least one arm is arranged to positively position the workpiece against said plurality of locators.

15. A method of securing a workpiece, comprising the steps of:

providing a fixture with a plurality of locators, a plurality of arms and a single lever;

placing the workpiece on said plurality of locators; and actuating said lever to drive said plurality of arms against the workpiece.

16. The method as recited in claim 15, wherein said plurality of arms actuates in the same direction as said lever during the actuating step.

17. The method as recited in claim 15, wherein said fixture is part of an electrical discharge machining apparatus.

18. The method as recited in claim 15, wherein said lever approaches a front of the fixture during the actuating step.

19. The method as recited in claim 15, wherein said actuating step positively positions said workpiece against said plurality of locators.

20. A fixture for securing a workpiece, comprising:

a base;

six locators on said base for accepting the workpiece;

a plurality of arms, each secured to said base at a pivot point; and a lever for actuating said plurality of arms against the workpiece so that said arms positively position the workpiece against said plurality of locators.

* * * * *